United States Patent [19]
Dortenzo

[11] 3,788,619
[45] Jan. 29, 1974

[54] STEEL CONVERTER VESSEL POLLUTION CONTROL METHOD AND APPARATUS

[75] Inventor: Alexander T. Dortenzo, Pittsburgh, Pa.

[73] Assignee: Pennsylvania Engineering Corporation, Pittsburgh, Pa.

[22] Filed: Feb. 23, 1972

[21] Appl. No.: 228,528

[52] U.S. Cl............... 266/13, 266/15, 266/35
[51] Int. Cl............................... C21c 5/48
[58] Field of Search.... 266/35, 13, 36 P, 15, 16, 19; 75/51, 52, 54, 56, 59, 60

[56] References Cited
UNITED STATES PATENTS

| | | | |
|---|---|---|---|
| 741,505 | 10/1903 | Kirk.................................. | 266/36 P |
| 1,505,281 | 8/1924 | Nagelvoort........................ | 75/60 |
| 2,803,450 | 8/1957 | McFeaters........................ | 266/35 |
| 3,026,102 | 3/1962 | McFeaters........................ | 266/35 |
| 3,236,630 | 2/1966 | Stephan............................ | 75/60 |
| 3,314,781 | 4/1967 | Johannsson et al.............. | 75/60 |
| 3,330,645 | 7/1967 | Moustier et al.................. | 75/60 |
| 3,599,949 | 8/1971 | Grenfell........................... | 75/60 |
| 3,603,572 | 9/1971 | Rosentern........................ | 266/35 |

Primary Examiner—Gerald A. Dost
Attorney, Agent, or Firm—Ralph G. Hohenfeldt et al.

[57] ABSTRACT

The hot evolved gases from a bottom blown steel converter vessel are delivered to a spray chamber near the vessel in which the gases are cooled by sufficient amount to make them acceptable to a remotely situated electrostatic precipitator in which finely divided solids are removed from the gases. The clean gas is withdrawn from the precipitator with a suction fan and delivered to a stack which discharges the gases to the atmosphere.

2 Claims, 2 Drawing Figures

STEEL CONVERTER VESSEL POLLUTION CONTROL METHOD AND APPARATUS

BACKGROUND OF THE INVENTION

The present invention is particularly advantageous in connection with modifying existing open hearth steel making plants for use of bottom blown converter vessels although the invention may be used in new plants too.

It is well known that in the open hearth process which is still extensively used in the United States for making steel it is difficult to prevent gas and smoke that is incidental to the process from escaping into the atmosphere and polluting it. On the other hand, it has been recognized that air pollution can be abated significantly by use of basic oxygen converter vessels in place of open hearth converters. Adapting open hearth plants for top blown basic oxygen converter vessels has, however, been deterred because of the large expense of modifying existing buildings to accommodate the taller converter vessels and their associated equipment. Much greater head room or roof height is required for top blown basic oxygen converter vessels because they use an oxygen lance which must be inserted through the top mouth of the vessel. Oxygen lances are usually more than 50 feet long and are inserted in the converter vessel in a substantially upright attitude, thus accounting for the greater roof height that is required.

It has also been recognized that air pollution might be minimized by using a bottom blown converter vessel instead of a top blown vessel, especially in those cases where remodeling of an open hearth plant is necessary to meet pollution control regulations. In bottom blown steel converter vessels, no lance is required since all gases and finely divided fluxing materials are introduced through tuyeres in the bottom of the vessel. The gas collection hood may be coupled closely with the vessel and a negative pressure may be maintained in the gas collection system so that little of the gas evolved from the vessel during refining escapes to the atmosphere.

In many existing open hearth plants electrostatic precipitators are used to clean the gases of particulate solids before the gases are discharged to the atmosphere. This is permissible in open hearth plants because the gases which are fed to the precipitator are usually below 550° F which is not too hot for the precipitator. One of the reasons for not taking advantage of the cleanliness capabilities of bottom blown vessels in open hearth plant remodeling projects is that the gases which evolve from the vessel are extremely hot, often in the range of 3,000° to 3,500° F which is too hot to be fed into an electrostatic precipitator. In some cases, therefore, otherwise operative and useful and costly precipitators have been discarded and expensive gas cleaning systems using venturi scrubbers are specified. This sometimes increases the prospective cost of remodeling an existing open hearth plant to such extent taking the plant out of service might be dictated in preference to trying to meet pollution abatement requirements.

SUMMARY OF THE INVENTION

In accordance with the invention, the highly effective gas cleaning characteristics of electrostatic precipitators can be utilized in either new plants or remodeled existing open hearth plants by using bottom blown converter vessels in association with a gas handling system that enables delivering dirty gas from the converter vessel to the precipitator at temperatures which are tolerable to the latter.

Objects of the present invention are to provide a gas cleaning system which requires little space and can be easily fit into a new plant without sacrifice of otherwise usable space and which may readily be fit into an existing plant in such manner that existing gas handling equipment requires minimum modification.

Another object is to situate inexpensive gas cooling equipment in proximity with a bottom blown converter vessel in such manner that most of the piping system and the precipitator are required to handle gases at relatively low temperatures.

A more general object is to improve the economics of complying with pollution abatement requirements in connection with remodeling existing steel converter plants and new plants.

How the foregoing and other more specific objects are achieved will appear throughout the course of a detailed description of an embodiment of the invention which will be set forth shortly hereinafter.

In general terms, the invention is characterized as an arrangement wherein there are one or more bottom blown steel converter vessels in a building. Each vessel has a water-cooled hood removably located over its mouth and a water-cooled duct connects to the hood. As near as possible to the vessel, and in a position where no interference is presented to the cranes and other apparatus for charging the vessel and handling its open contents, a water spray chamber is installed. The water-cooled duct from the hood has a short run to the spray chamber in which the gases evolved from the vessel are cooled from over 3,000° to 550° F or 500° F. The relatively cool gases from each spray chamber associated with a converter vessel are delivered to an existing or new dirty gas main to which the inlet of an existing or new electrostatic precipitator is connected. The latter separates particulate matter such as smoke from the gases which are delivered by means of an exhaust fan to a stack. Carbon monoxide is precluded from igniting in the precipitator by burning it previously in the hood or above the melt surface in the vessel.

A more detailed description of an illustrative embodiment of the invention will now be set forth in reference to the drawings.

DESCRIPTION OF A PREFERRED EMBODIMENT

Figure 1:
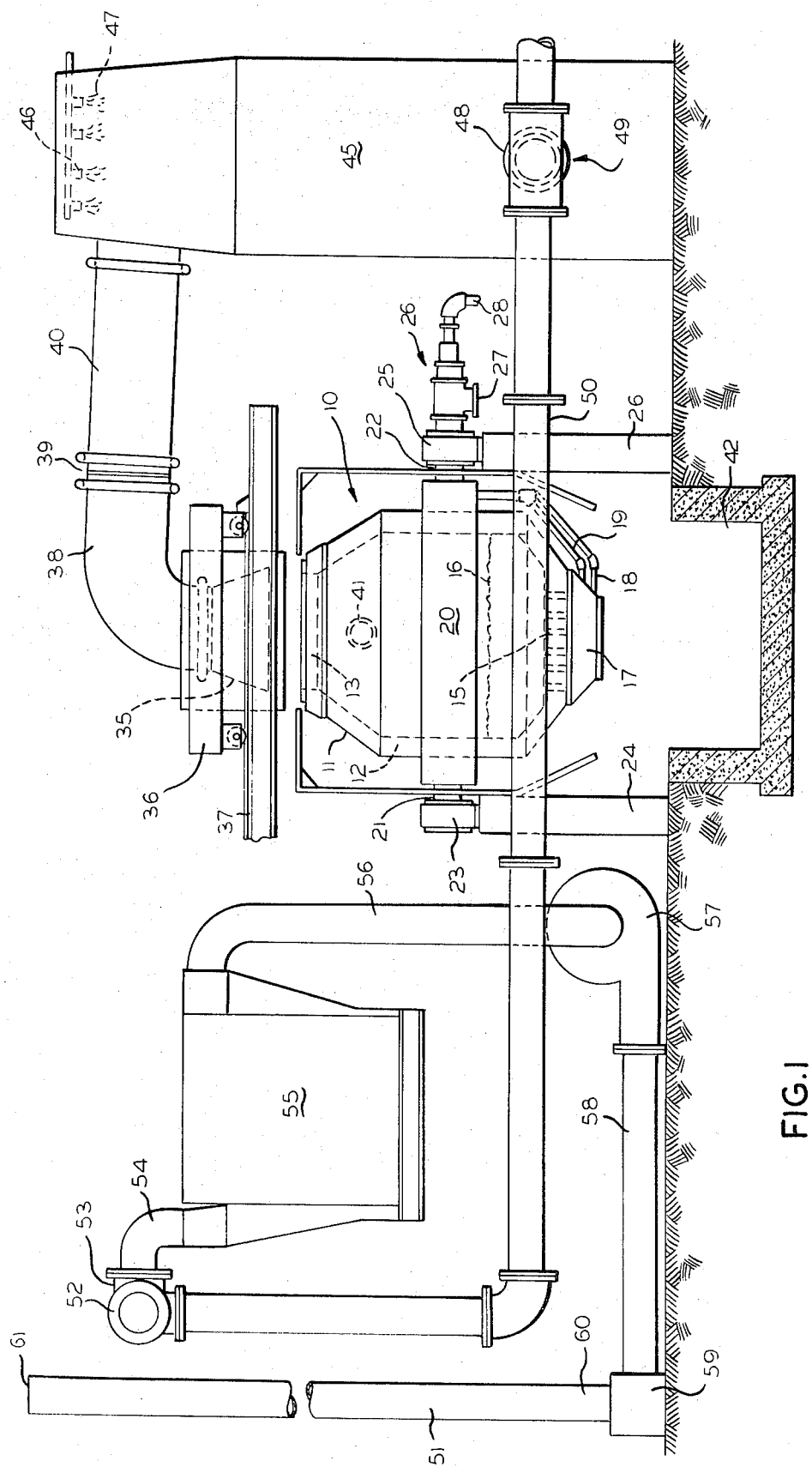
FIG. 1 is a diagrammatic longitudinal elevation view of a steel conversion plant using bottom blown vessels and the new gas handling system.
Figure 2:
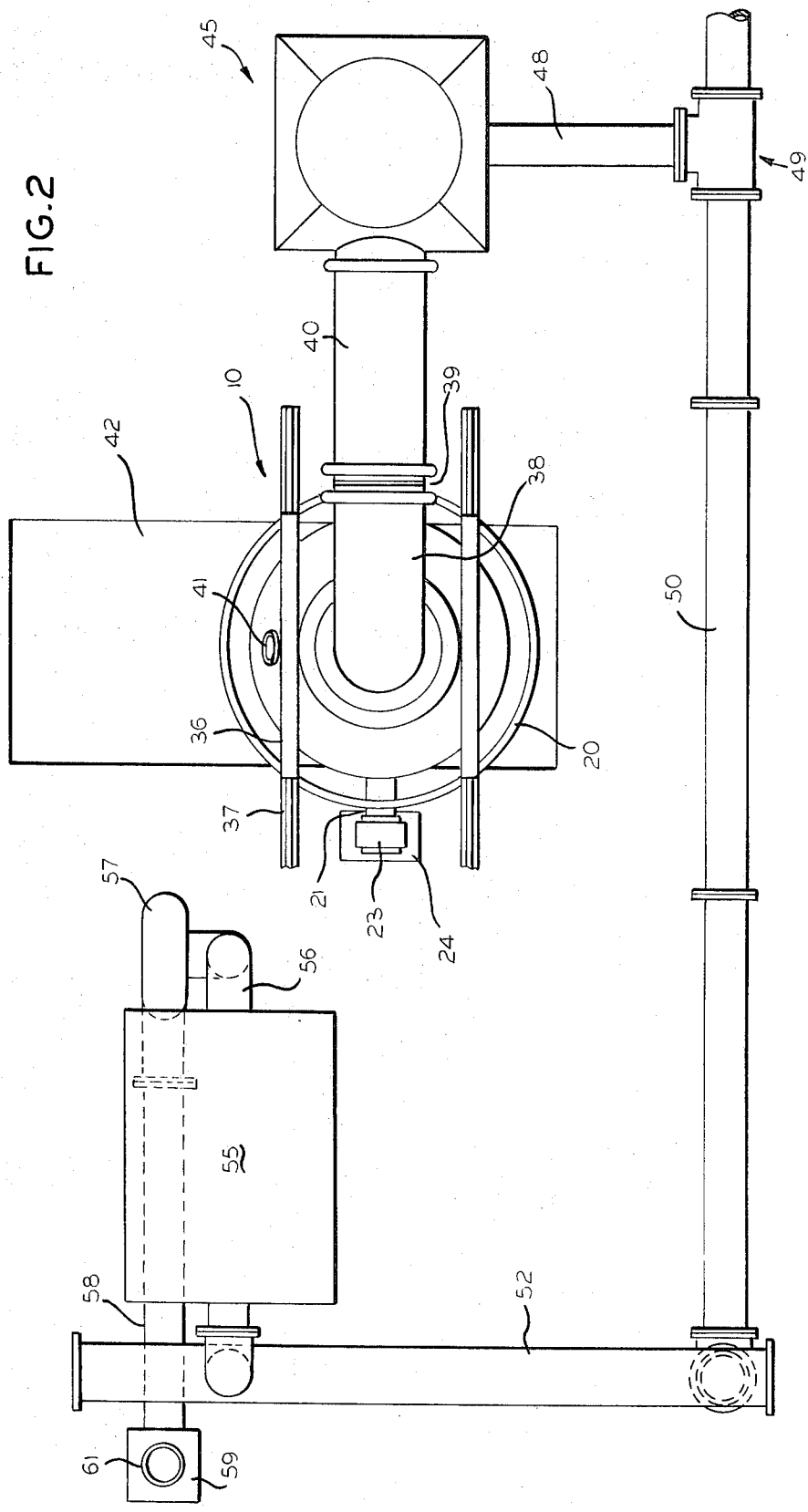
FIG. 2 is a diagrammatic plan view of the equipment shown in FIG. 1.

In FIGS. 1 and 2 a bottom blown steel converter vessel is generally designated by the numeral 10. In some plants a number of such vessels are arranged in a row longitudinally of a building interior. Vessel 10 comprises a metal shell 11 which has an interior lining of refractory material 12. The vessel has a mouth 13 at its top and a set of tuyeres 15 at its bottom. The tuyeres extend through refractory lining 11 and are adapted to inject oxygen and other gases and fine materials entrained in gases into molten metal which may occupy the interior of vessel 10 to a depth approximating the broken irregular line 16. The bottom of vessel 10 is equipped with a chamber 17 in which there are suitable headers, not shown, which connect with tuyeres 15. Feed pipes 18 and 19 connect with the tuyeres. Pipe 19, for instance, delivers pressurized oxygen to the tuyeres so that the oxygen may permeate the molten metal in the vessel and reduce carbon and other elements therein. Fluxes and other materials needed for converting molten pig iron to steel within the vessel are finely divided and entrained in the oxygen for delivery through the tuyeres. Pipe 18 is for delivery of a hydrocarbon gas such as propane through suitable passageways in the tuyeres adjacent the passageways through which oxygen is injected into the molten metal. Cracking of the hydrocarbon is an endothermic reaction which cools the superheated metal in the exit region of the tuyeres which results from the oxygen-carbon reaction. Reduction of the metal temperature in this region inhibits deterioration of the refractory bottom of vessel 10 which would ordinarily result if there were no cooling means.

Vessel 10 is supported conventionally on a trunnion ring 20 from which a pair of trunnion pins 21 and 22 project. Trunnion pin 21 is journaled in a bearing structure 23 which is supported on a footing 24. Trunnion pin 22 is also journaled in a bearing structure 25 which is supported on a footing 26. The mechanism for tilting vessel 10 about the axis of the trunnion pins 21, 22 is omitted from the drawing because it is known. Trunnion pin 22 has one or more axial passageways which communicate with hydrocarbon gas pipe 18 and oxygen pipe 19 through suitable passageways in the trunnion ring 20. Trunnion pin 22 is connected with a swivel joint assembly 26 which has one inlet 27 for oxygen in which finely divided materials are entrained and another inlet 28 for hydrocarbon gas. Inlets 27 and 28 remain stationary while other parts of the rotary joint assembly 26 turn along with trunnion pin 22 when the vessel is tilted.

During the refining process when oxygen is being blown through molten metal 16 carbon dioxide, carbon monoxide, other gases, smoke and other particulate materials evolve from the vessel and must be prevented from polluting the atmosphere. At the mouth 13 of the vessel, the gases are about 3,000° to 3,500° F, temperatures which are much too high for the gases to be delivered directly to an electrostatic precipitator for removing the particulate matter therefrom. Accordingly, a water-cooled gas collection hood 35 is positioned over vessel 10. Hood 35 is mounted on a wheeled carriage 36 so that it may be moved away from vessel 10 on a track 37 when desired. The hood 35 is connected to a jacketed water-cooled elbow 38 which makes a connection at 39 with a water-cooled duct 40. Although the structural details are not shown, the conically shaped hood 35 may be adapted for being raised and lowered with respect to vessel 10 so that the vessel may be tilted to discharge its molten contents through a pouring spout 41 or so the vessel may be inverted to discharge slag through its mouth 13. Ladles for receiving refined molten metal or slag may be positioned in a pit 42 beneath vessel 10. The carts for supporting and moving the slag and metal ladles in pit 42 are not shown since they are conventional.

In accordance with the invention, the hot dirty gases incidental to converting impure ferrous metal to steel are conducted through the short water-cooled duct 40 to a spray chamber which is generally designated by the reference numeral 45. Internally of the spray chamber and near its top there are a plurality of atomizing nozzles 46 which project finely divided water or mist 47 vertically through spray chamber 45. The intimate contact between the water and the evolved gases in the chamber 45 results in cooling of the gases to a temperature of under 600° F and preferably 550° F or less. At the same time some of the particulate matter in the gas settles in the bottom of the spray chamber and must be removed periodically as sludge. Much of the fine particulate matter, however, is conveyed in the cooled gas and leaves the outlet of chamber 45 through an exit pipe 48.

As can be seen in FIG. 2, spray chamber 45 is in alignment longitudinally of the building with vessel 10 so that the spray chamber is not in the way of the overhead crane or any other apparatus that runs along the sides of the converter vessel for charging it with hot metal, scrap or additives or for removing the slag and molten metal ladles. More than one associated pairs of converter vessels 10 and spray chambers 45 may be arranged in a row in the interior of a single plant. Spray chambers 45 are near their associated converter vessels 10 so that water-cooled ducts such as 40 of minimal length can be used for conveying the extremely hot gases from the vessel. In other gas cooling systems, it is not uncommon to have rather long water-cooled ducts which is disadvantageous because such high temperature ducts are expensive to build and maintain. Moreover, there is a considerable cost reduction effected in a system such as the present one where most of the gases are conveyed in a rather cool state whereupon ordinary uncooled and unjacketed piping may be used.

As can be seen in thp drawings, the gas exit pipe 48 from spray chamber 45 connects with a Tee 49 in an exhaust pipe 50 which runs longitudinally of the plant and connects by means of a riser pipe 51 to a transverse overhead pipe 52. The overhead pipe has a branch 53 connected with the inlet 54 of an electrostatic precipitator 55. The gases which enter precipitator 55, in accordance with the invention, are under 550° F so as to not exceed the temperature rating of the precipitator. As is known, the electrostatic precipitator removes particulate matter from the gas and the latter is drawn from the precipitator through a pipe 56 which is connected to a motor driven exhaust fan 57 that need be the only exhaust fan used for the entire gas handling system. Even though the gas mixture evolved from vessel 10 occupies a large volume because of its temperature, a relatively small exhaust fan 57 may be used because gas volume is markedly reduced by virtue of the gases being cooled as much as 3,000° F in spray chamber 45.

The exhaust gases which are drawn out of the system by fan 57 comprise mainly carbon dioxide which is a non-pollutant. The gases are delivered through a pipe 58 to the bottom chamber 59 of a stack 60 and discharged to the atmosphere from the upper end 61. By not closing hood 35 tightly on vessel 10 air can enter to burn evolved carbon monoxide in the hood so that this gas cannot ignite elsewhere in the system nor can this toxic gas be discharged to the atmosphere from the stack.

In summary, a gas cleaning arrangement for bottom blown converter vessels has been described. The system is distinguished by its adaptability for use in new plants or in open hearth steel making plants which are being remodeled for use of bottom blown converter vessels. The system permits use of new or existing electrostatic precipitators by virtue of the gases evolved from the converter vessel being cooled in proximity with them and delivered to the precipitator in a low temperature state. The system is compact and may be installed without significant building modifications in most cases.

Thp described embodiment is intended to be illustrative rather than limiting for the invention may be variously embodied and is to be limited only by interpretation of the claims which follow.

I claim:

1. A steel making system characterized by its low atmospheric pollution characteristics, comprising:
   a. a refractory lined converter vessel having tuyere means for injecting gas and finely divided solids entrained in a gas beneath the surface of molten metal contained in the vessel to effectuate refinement of the metal, said converter vessel having a mouth which is at the top of the vessel during refining operations and trunnion means supporting it for rotation, said tuyere means being remote from the vessel mouth,
   b. spray chamber means located adjacent one side of said vessel in such position that a projection of the trunnion axis would intersect said chamber means whereby to maintain a substantially constant distance between said vessel and said chamber for any rotational position of said vessel, said chamber means having an inlet and an outlet and means for spraying water into a gas stream flowing between said inlet and outlet interiorly of the chamber means to thereby cool a gas stream,
   c. water-cooled hood means positionable above the mouth of said vessel to collect gas evolved therefrom which gas contains particulate substances and is relatively hot,
   d. water-cooled duct means interconnecting said hood means with the inlet of said chamber means,
   e. electrostatic precipitator means located at a side of said vessel opposite from the side on which said spray chamber is located and at an elevation substantially above the elevation of the bottom of said vessel, said precipitator means having an inlet and an outlet,
   f. pipe means having a part connected to the outlet of said spray chamber means at one elevation and another part extending in parallelism with the axis of said trunnion means at the same one elevation and still another part rising to a higher elevation and connected with the inlet of said precipitator means,
   g. exhaust fan means having an inlet coupled to the outlet of said precipitator means and having an outlet, said fan means being operative to draw gas through the entire system including the hood means, duct means, spray chamber means, pipe means and precipitator means.

2. The system defined in claim 1 including:
   a. a stack means having an inlet coupled with the outlet of said fan means.

* * * * *